(12) United States Patent
Takata et al.

(10) Patent No.: US 10,878,978 B2
(45) Date of Patent: Dec. 29, 2020

(54) WIRE AND VEHICLE WITH THE SAME

(71) Applicant: TOYOTA JIDOSHA KABUSHIKI KAISHA, Toyota (JP)

(72) Inventors: Kazunori Takata, Toyota (JP); Hiroki Kawakami, Okazaki (JP); Shinji Oshita, Toyota (JP); Taku Furuta, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 135 days.

(21) Appl. No.: 16/257,592

(22) Filed: Jan. 25, 2019

(65) Prior Publication Data

US 2019/0244728 A1   Aug. 8, 2019

(30) Foreign Application Priority Data

Feb. 6, 2018   (JP) ................................ 2018-019427

(51) Int. Cl.
*H01B 7/00* (2006.01)
*B60R 16/02* (2006.01)
*H01B 13/012* (2006.01)

(52) U.S. Cl.
CPC ... *H01B 13/01254* (2013.01); *B60R 16/0215* (2013.01)

(58) Field of Classification Search
CPC ........ H01B 13/01254; H01B 13/01209; H01B 13/00; H01B 9/00; H01B 9/001; H01B 7/08; H01B 7/0807; H01B 7/00; H01B 7/0009; H01B 13/012; B60R 16/0215; B60R 16/0207; B60R 16/00; B60R 16/02
USPC ...... 174/68.1, 72 A, 84 R, 88 R, 135, 137 R, 174/138 R, 117 F, 117 FF, 117 R
See application file for complete search history.

(56) References Cited

U.S. PATENT DOCUMENTS

| | | | | |
|---|---|---|---|---|
| 4,096,349 A | * | 6/1978 | Donato | H02G 3/0431 174/68.3 |
| 4,875,871 A | * | 10/1989 | Booty, Sr. | H01R 25/162 174/72 C |
| 4,944,687 A | * | 7/1990 | Mailly | H02G 3/0608 174/86 |
| 5,917,149 A | * | 6/1999 | Barcley | H05K 1/0281 174/36 |
| 6,168,341 B1 | | 1/2001 | Chene et al. | |
| 6,194,664 B1 | * | 2/2001 | Zamora | H02G 11/00 174/117 F |
| 6,417,452 B1 | * | 7/2002 | Doshita | B60R 16/0215 174/135 |

(Continued)

FOREIGN PATENT DOCUMENTS

| | | |
|---|---|---|
| CN | 1216083 A | 5/1999 |
| JP | 2014-116286 A | 6/2014 |
| WO | 2017/072073 A1 | 5/2017 |

*Primary Examiner* — Angel R Estrada
(74) *Attorney, Agent, or Firm* — Oliff PLC

(57) ABSTRACT

A wire includes a metal wire which has a flat shape, and which is formed of a rigid body. The metal wire has a bending portion that is bendable at any position in a longitudinal direction of the metal wire. A vehicle includes the wire, the wire is disposed along a rocker panel inside the vehicle in a state of being extended in a straight line without being bent at the bending portion, and the bending portion is disposed at a connecting portion at which the rocker panel and a center pillar are connected to each other.

10 Claims, 3 Drawing Sheets

(56) References Cited

U.S. PATENT DOCUMENTS

| | | | |
|---|---|---|---|
| 6,444,903 B2 * | 9/2002 | Saeki | H02G 3/0437 |
| | | | 174/135 |
| 8,796,546 B2 * | 8/2014 | Lynch | H01B 17/00 |
| | | | 174/84 R |
| 10,181,689 B2 * | 1/2019 | Kobayashi | H01R 25/162 |
| 2014/0131071 A1 | 5/2014 | Tanaka et al. | |
| 2018/0317334 A1 | 11/2018 | Grotz et al. | |

* cited by examiner

WIRE AND VEHICLE WITH THE SAME

INCORPORATION BY REFERENCE

The disclosure of Japanese Patent Application No. 2018-019427 filed on Feb. 6, 2018 including the specification, drawings and abstract is incorporated herein by reference in its entirety.

BACKGROUND

1. Technical Field

The present disclosure relates to a wire and a vehicle in which the wire is mounted.

2. Description of Related Art

In Japanese Unexamined Patent Application Publication No. 2014-116286 (JP 2014-116286 A) discloses a flexible flat wiring member in which a plurality of conductors arranged in parallel in a width direction is covered with a covering member.

SUMMARY

When the flexible flat wiring member as disclosed in JP 2014-116286 A is used as a wire in a vehicle, when the wire is assembled to the vehicle, it is necessary to reduce slackness or the like of the wire in addition to the assembling, which may lead to deterioration of workability. For this reason, it is conceivable that the flat wiring member for a vehicle is formed of a rigid body. If the flat wiring member is formed of the rigid body, there may be no need to reduce slackness of the flat wiring member at the time of assembling, and the time required to assemble the wire to the vehicle may be reduced.

However, in a case of using the flat wiring member of the rigid body, when the flat wiring member is transported or brought into the vehicle, it is difficult to easily handle the flat wiring member. Therefore, it is difficult to achieve compatibility between the assembling property and the handling property of the flat wiring member of the rigid body.

The present disclosure provides a wire excellent in a handling property and a vehicle in which the wire is mounted.

A first aspect of the disclosure relates to a wire. The wire includes a metal wire having a flat shape. The metal wire is formed of a rigid body. The metal wire has a bending portion that is bendable at any position in a longitudinal direction of the metal wire.

According to the first aspect of the disclosure, it is possible to bend the wire at the bending portion. As a result, it is possible to improve the handling property of the wire when the wire is transported or brought into the vehicle.

In the wire according to the first aspect of the disclosure, the metal wire may include a first flat wire having a belt shape, and a second flat wire having a belt shape and electrically connected with the first flat wire. The bending portion may have a hinge structure in which an end of the first flat wire in a longitudinal direction and an end of the second flat wire in a longitudinal direction are connected.

According to the aspect of the disclosure, it is possible to make the bending portion simple in structure.

In the wire according to the aspect of the disclosure, the metal wire may include a core member connecting the end of the first flat wire in the longitudinal direction and the end of the second flat wire in the longitudinal direction to each other. The hinge structure may have a shaft cylindrical portion into which the core member is inserted, and a spring portion. The shaft cylindrical portion and the spring portion may be provided at each of the end of the first flat wire and the end of the second flat wire. The spring portion of the first flat wire may contact the shaft cylindrical portion of the second flat wire with a predetermined contact pressure, and the spring portion of the second flat wire may contact the shaft cylindrical portion of the first flat wire with the predetermined contact pressure.

According to the aspect of the disclosure, it is possible to obtain stable electrical connection between the first flat wire and the second flat wire.

The wire according to the aspect of the disclosure may further include a covering member formed of a material having flexibility and an insulating property, the covering member being configured to cover the hinge structure in which the first flat wire and the second flat wire are connected to each other.

According to the aspect of the disclosure, it is possible to insulate the connecting portion between the first flat wire and the second flat wire while securing the bending property of the wire.

In the wire according to the aspect of the disclosure, the first flat wire and the second flat wire may have the same shape.

A second aspect of the disclosure relates to a vehicle. The vehicle includes the metal wire according to the first aspect, a rocker panel, and a center pillar. The wire is disposed along the rocker panel inside the vehicle when the metal wire is in a state of being extended in a straight line (in the present specification, "straight line" includes "approximately straight line" in its meaning) without being bent at the bending portion, and the bending portion is disposed at a connecting portion at which the rocker panel and the center pillar are connected to each other.

According to the second aspect of the disclosure, the bending portion, which has a relatively large thickness in the wire, can be disposed at the connecting portion between the rocker panel and the center pillar, which has a relatively more free space in the vehicle. In this way, the increase in the space in which the bending portion is to be disposed can be suppressed.

According to the aspects of the disclosure, the wire excellent in the handling property and the vehicle in which the wire is mounted can be implemented.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Overview

A wire according to an embodiment has a bending portion that is bendable at any position in a longitudinal direction of the wire. Since the wire is bent at the bending portion, it is possible to improve the handling property of the wire when the wire is transported or brought into a vehicle.

Configuration of Wire

Figure 1:
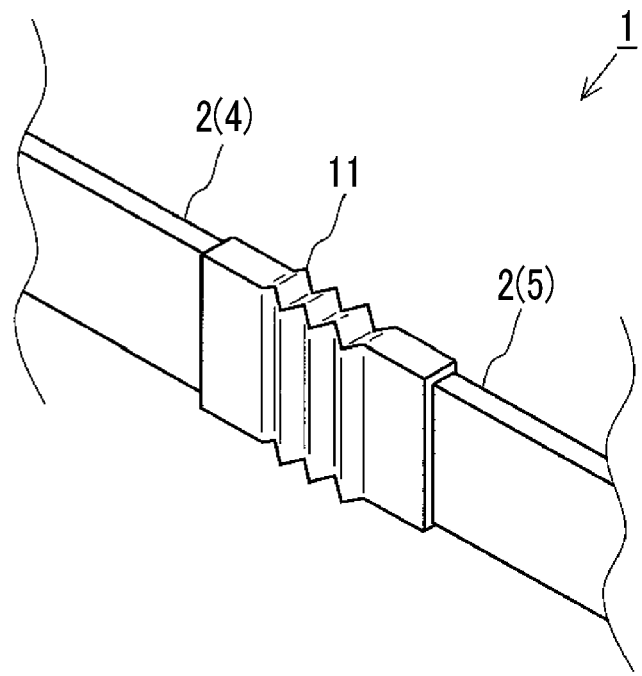
FIG. 1 is a perspective view of a wire according to an embodiment.

Hereinafter, a wire 1 according to the embodiment will be described with reference to FIGS. 1 to 3. FIG. 1 is a perspective view of the wire 1 according to the embodiment, FIG. 2 is a perspective view of the wire 1 represented with a covering member 11 being excluded for the purpose of easy description of the wire 1 shown in FIG. 1, and FIG. 3 is an exploded perspective view of the wire 1 shown in FIG. 2.

Figure 2:
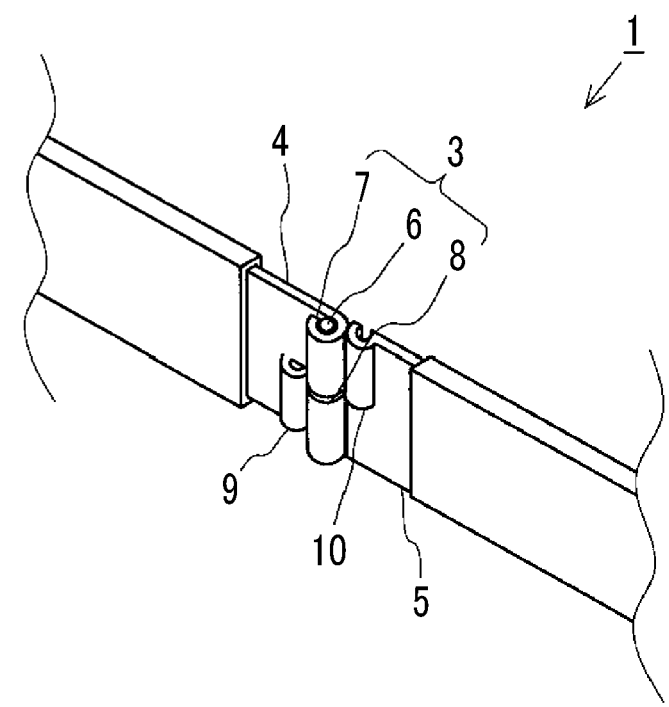
FIG. 2 is a perspective view of the wire excluding a covering member according to the embodiment.
Figure 3:
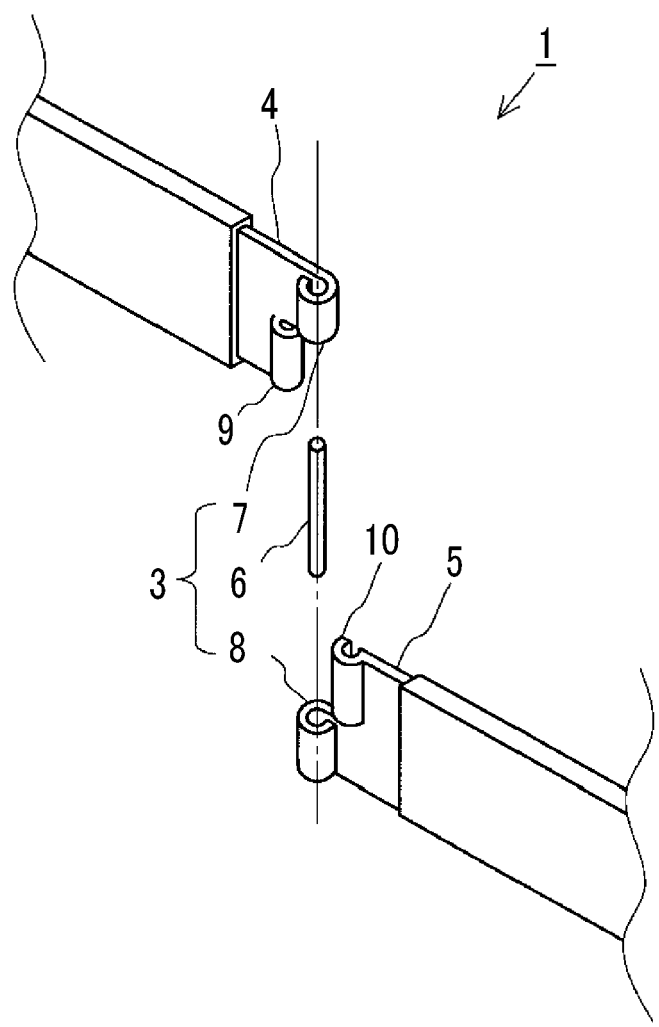
FIG. 3 is an exploded perspective view of the wire excluding the covering member according to the embodiment.

As shown in FIGS. 1 to 3, the wire 1 according to the embodiment includes a flat metal wire 2 formed of a rigid body. The metal wire 2 has a bending portion 3 at any position in a longitudinal direction of the metal wire 2, where the wire 1 can be bent.

The metal wire 2 includes a first flat wire 4, a second flat wire 5 electrically connected to the first flat wire 4, and a core member 6. The core member 6 connects an end of the first flat wire 4 in the longitudinal direction and an end of the second flat wire 5 in the longitudinal direction. The first flat wire 4 and the second flat wire 5 are metal plates of aluminum or the like and are rigid bodies having a predetermined thickness. Parts of the first flat wire 4 and the second flat wire 5 other than the ends thereof are covered with an insulator for insulating. The end of the first flat wire 4 in the longitudinal direction is provided with a shaft cylindrical portion 7 and a spring portion 9. The end of the second flat wire 5 in the longitudinal direction is provided with a shaft cylindrical portion 8 and a spring portion 10. The core member 6 is inserted into the shaft cylindrical portions 7, 8.

The shaft cylindrical portions 7, 8 are formed by bending a part of the end of the first flat wire 4 and a part of the end of the second flat wire 5 into the cylindrical shape.

The spring portions 9, 10 are formed by bending the other part of the end of the first flat wire 4 and the other part of the end of the second flat wire 5.

In a state where the wire 1 is assembled, a hinge structure is constituted by one end of the first flat wire 4 and one end of the second flat wire 5, by making the first flat wire 4 and the second flat wire 5 to be engaged through the core member 6 which is inserted into the shaft cylindrical portions 7, 8. The first flat wire 4 and the second flat wire 5 can be bent by rotation around the core member 6 as a central axis. Further, in the state where the wire 1 is assembled, the spring portion 9 of the first flat wire 4 contacts the shaft cylindrical portion 8 of the second flat wire 5 with a predetermined contact pressure, and the spring portion 10 of the second flat wire 5 contacts the shaft cylindrical portion 7 of the first flat wire 4 with a predetermined contact pressure.

The covering member 11 covering the connecting portion between the first flat wire 4 and the second flat wire 5 is provided so as to insulate the connecting portion between the first flat wire 4 and the second flat wire 5. The covering member 11 is formed using a flexible insulating material so as to be able to follow the rotation of the first flat wire 4 and the second flat wire 5. The shape of the covering member 11 may be, for example, a bellows shape, but the shape is not particularly limited as long as it is able to follow the rotation of the first flat wire 4 and the second flat wire 5.

Configuration of Vehicle in which Wire is Mounted

Figure 4:
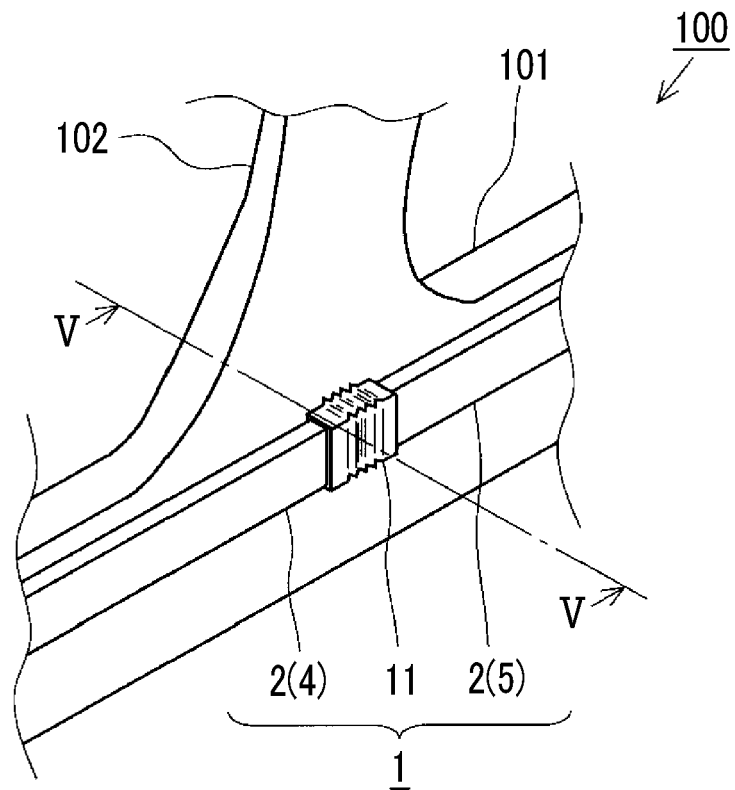
FIG. 4 is a schematic view of a part inside a vehicle in which the wire according to the embodiment is mounted.

A configuration of a vehicle 100 in which the wire 1 according to the embodiment is mounted will be described with reference to FIGS. 4 and 5. FIG. 4 is a schematic view showing the vicinity of the connecting portion between a rocker panel 101 and a center pillar 102 inside the vehicle 100 in which the wire 1 is mounted, and FIG. 5 is a schematic sectional view taken along the line V-V in FIG. 4 as viewed from an extending direction of the wire.

Figure 5:
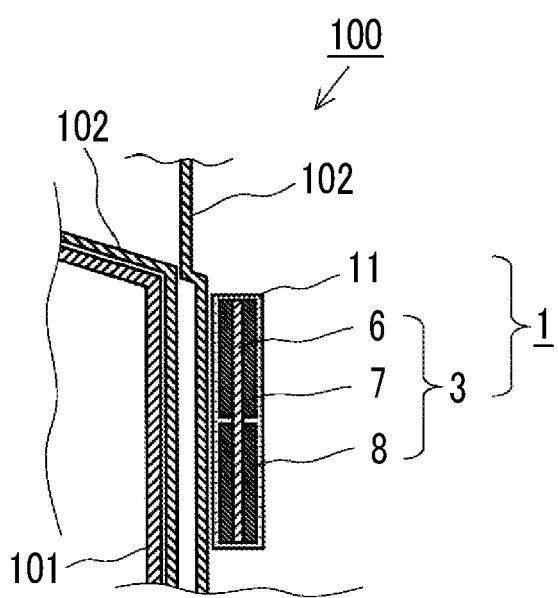
FIG. 5 is a schematic sectional view taken along the line V-V in FIG. 4 as viewed from an extending direction of the wire.

As shown in FIGS. 4 and 5, the wire 1 is disposed along the rocker panel 101 inside the vehicle in a state of being extended in a straight line without being bent at the bending portion 3, and the bending portion 3 is disposed at the connecting portion between the rocker panel 101 and the center pillar 102. Since the connecting portion between the rocker panel 101 and the center pillar 102 has a relatively more free space, it is suitable for disposing a relatively bulky bending portion 3 of the wire 1.

When vehicle parts are transported from a part manufacturing factory to a vehicle assembling factory, the vehicle parts are loaded to a transportable return box that has been conventionally used and then transported. However, an object that is long and rigid such as the flat wire disposed along the rocker panel inside the vehicle as described above cannot be accommodated in the existing transportable return box, and thus cannot be transported using the existing transportable return box.

Since the wire 1 according to the embodiment can be bent at the bending portion 3, the bent wire 1 can be accommodated in the existing transportable return box and transported using the existing transportable return box. As a result, it is possible to improve the handling property during transportation.

In addition, when the flat wire is assembled to the vehicle in the vehicle assembling factory, it is needed that an assembling worker brings the flat wire into the vehicle from the outside of the vehicle. The wire 1 according to the embodiment can be brought into the vehicle in a state of being bent at the bending portion 3, and be extended and in a straight line inside the vehicle and then assembled. Therefore, it is also possible to improve the handling property at the time of mounting the wire 1 inside the vehicle.

Effect

The wire 1 according to the embodiment can be bent at the bending portion 3 which is provided at any position in the longitudinal direction of the metal wire 2. Therefore, when the wire 1 is transported or brought into the vehicle for mounting, the handling property can be improved.

Direct connection between the first flat wire 4 and the second flat wire 5 makes it possible to reduce the number of parts for connecting the flat wires to each other. As a result, the weight and the parts cost of the vehicle can be reduced.

With the wire 1 according to the embodiment, the spring portion 9 of the first flat wire 4 contacts the shaft cylindrical portion 8 of the second flat wire 5 with a predetermined contact pressure and the spring portion 10 of the second flat wire 5 contacts the shaft cylindrical portion 7 of the first flat wire 4 with a predetermined contact pressure. Therefore, stable electric connection can be obtained, regardless of relative rotational positions of the first flat wire 4 and the second flat wire 5.

With the wire 1 according to the embodiment, the connecting portion between the first flat wire 4 and the second flat wire 5 is covered with the covering member 11 formed of the material having the flexibility and the insulating property, which makes it possible to insulate the connecting portion, with the bending property of the wire being secured.

In the vehicle 100 including the wire 1 according to the embodiment, the bending portion 3 having a relatively large thickness in the wire 1 is disposed at the connecting portion between the rocker panel 101 and the center pillar 102 where there is a relatively more free space in the vehicle 100, which makes it possible to suppress the increase in the space for disposing the bending portion 3.

In addition, in the embodiment, although the bending portion 3 has been described to be provided at any position along the wire 1, the bending portion 3 may be provided at the center position in the longitudinal direction of the wire 1 such that the first flat wire 4 and the second flat wire 5 have the same shape. In this case, since the bending is performed at the center of the wire 1, a more compact structure is possible.

In the embodiment, although the bending portion 3 has been described to have the hinge structure, the bending portion 3 may have another known structure in which bending is possible at any position in the longitudinal direction of the metal wire 2 such as the structure connected through the flexible conductive member.

The wire according to the embodiment can be suitably used, for example, as the wire to be mounted in the vehicle.

What is claimed is:

1. A wire comprising:
   a metal wire having a flat shape, the metal wire being formed of a rigid body, wherein
   the metal wire has a bending portion that is bendable at any position in a longitudinal direction of the metal wire;
   the metal wire includes a first flat wire having a belt shape, and a second flat wire having a belt shape and electrically connected with the first flat wire;
   the bending portion has a hinge structure in which an end of the first flat wire in a longitudinal direction and an end of the second flat wire in a longitudinal direction are connected;
   the metal wire includes a core member connecting the end of the first flat wire in the longitudinal direction and the end of the second flat wire in the longitudinal direction to each other;
   the hinge structure has a shaft cylindrical portion into which the core member is inserted, and a spring portion, and the shaft cylindrical portion and the spring portion are provided at each of the end of the first flat wire and the end of the second flat wire;
   the spring portion of the first flat wire contacts the shaft cylindrical portion of the second flat wire with a predetermined contact pressure; and
   the spring portion of the second flat wire contacts the shaft cylindrical portion of the first flat wire with the predetermined contact pressure.

2. The wire according to claim 1, further comprising a covering member formed of a material having flexibility and an insulating property, the covering member being configured to cover the hinge structure in which the first flat wire and the second flat wire are connected.

3. The wire according to claim 2, wherein the first flat wire and the second flat wire have the same shape.

4. A vehicle comprising:
   the wire according to claim 3;
   a rocker panel; and
   a center pillar, wherein:
   the metal wire is disposed along the rocker panel inside the vehicle when the metal wire is in a state of being extended in a straight line without being bent at the bending portion; and
   the bending portion is disposed at a connecting portion at which the rocker panel and the center pillar are connected to each other.

5. A vehicle comprising:
   the wire according to claim 2;
   a rocker panel; and
   a center pillar, wherein:
   the metal wire is disposed along the rocker panel inside the vehicle when the metal wire is in a state of being extended in a straight line without being bent at the bending portion; and
   the bending portion is disposed at a connecting portion at which the rocker panel and the center pillar are connected to each other.

6. A wire comprising:
   a metal wire having a flat shape, the metal wire being formed of a rigid body, wherein
   the metal wire has a bending portion that is bendable at any position in a longitudinal direction of the metal wire,
   the metal wire includes a first flat wire having a belt shape, and a second flat wire having a belt shape and electrically connected with the first flat wire, and
   the bending portion has a hinge structure in which an end of the first flat wire in a longitudinal direction and an end of the second flat wire in a longitudinal direction are connected; and
   further comprising a covering member formed of a material having flexibility and an insulating property, the covering member being configured to cover the hinge structure in which the first flat wire and the second flat wire are connected.

7. The wire according to claim 6, wherein the first flat wire and the second flat wire have the same shape.

8. A vehicle comprising:
   the wire according to claim 7;
   a rocker panel; and
   a center pillar, wherein:
   the metal wire is disposed along the rocker panel inside the vehicle when the metal wire is in a state of being extended in a straight line without being bent at the bending portion; and
   the bending portion is disposed at a connecting portion at which the rocker panel and the center pillar are connected to each other.

9. A vehicle comprising:
   the wire according to claim 6;
   a rocker panel; and
   a center pillar, wherein:
   the metal wire is disposed along the rocker panel inside the vehicle when the metal wire is in a state of being extended in a straight line without being bent at the bending portion; and
   the bending portion is disposed at a connecting portion at which the rocker panel and the center pillar are connected to each other.

10. A vehicle comprising:
    a metal wire having a flat shape, the metal wire being formed of a rigid body, wherein the metal wire has a bending portion that is bendable at any position in a longitudinal direction of the metal wire;

a rocker panel; and
a center pillar, wherein:
   the metal wire is disposed along the rocker panel inside the vehicle when the metal wire is in a state of being extended in a straight line without being bent at the bending portion; and
   the bending portion is disposed at a connecting portion at which the rocker panel and the center pillar are connected to each other.

\* \* \* \* \*